US011910172B1

(12) United States Patent
Stohr

(10) Patent No.: US 11,910,172 B1
(45) Date of Patent: Feb. 20, 2024

(54) SYSTEM FOR GENERATING LOW FREQUENCY VIBRATION WAVES TO EMULATE AUDIO FREQUENCY

(71) Applicant: Luis Stohr, Redondo Beach, CA (US)

(72) Inventor: Luis Stohr, Redondo Beach, CA (US)

( * ) Notice: Subject to any disclaimer, the term of this patent is extended or adjusted under 35 U.S.C. 154(b) by 0 days.

(21) Appl. No.: 18/129,047

(22) Filed: Mar. 30, 2023

Related U.S. Application Data

(63) Continuation-in-part of application No. 17/975,262, filed on Oct. 27, 2022, now Pat. No. 11,683,633.

(51) Int. Cl.
*H04R 11/02* (2006.01)
*H04R 3/08* (2006.01)
*H04R 9/04* (2006.01)
*H04R 1/46* (2006.01)

(52) U.S. Cl.
CPC ................. *H04R 3/08* (2013.01); *H04R 1/46* (2013.01); *H04R 9/046* (2013.01)

(58) Field of Classification Search
CPC . H04R 1/24; H04R 1/26; H04R 23/02; H04R 2460/13; B06B 1/16; B06B 1/161
See application file for complete search history.

(56) References Cited

U.S. PATENT DOCUMENTS 5,579,284 A 11/1996 May
5,706,251 A 1/1998 May
6,412,594 B1 * 7/2002 Small ....................... H04R 1/42 181/149
6,792,122 B1 * 9/2004 Okada .................... H04R 5/033 381/151
7,418,757 B2 * 9/2008 Gatzerneyer ...... A61C 17/3481 15/105
7,599,506 B2 * 10/2009 Filo ........................ H04R 5/023 381/124
8,295,506 B2 10/2012 Kassayan et al.
8,325,964 B2 12/2012 Weisman
9,947,186 B2 * 4/2018 Macours ................. G06F 3/016
10,150,029 B2 * 12/2018 Yamano .................. G06F 1/266
10,754,428 B1 * 8/2020 Parise ....................... H04R 3/04
10,911,851 B2 * 2/2021 Noh ...................... G06F 1/1684
2003/0219140 A1 * 11/2003 Choi ....................... B06B 1/045 381/412
2017/0116977 A1 * 4/2017 Logan ..................... B06B 1/045
2022/0254325 A1 * 8/2022 Nishigori ............... H04R 1/026
2022/0395861 A1 * 12/2022 Snow ...................... G06F 3/016
2023/0075084 A1 * 3/2023 Te Pas ............... A61H 23/0263

FOREIGN PATENT DOCUMENTS

WO WO-2022041713 A1 * 3/2022 ........... A61C 17/221

* cited by examiner

*Primary Examiner* — Ryan Robinson
(74) *Attorney, Agent, or Firm* — Che-Yang Chen; Law Office of Michael Chen

(57) ABSTRACT

A system for generating low and low to middle-frequency vibration waves to emulate low and low to middle audio frequencies includes an exciter device including a solenoid device located adjacent to a vibration micro motor; wherein the solenoid device includes an impact member contacted to a returning spring and configured to generate low frequency vibration waves; wherein the vibration micro motor includes a motor coupled to at least one rotatable metal member and configured to generate low-middle frequency vibration waves.

15 Claims, 13 Drawing Sheets

17

SYSTEM FOR GENERATING LOW FREQUENCY VIBRATION WAVES TO EMULATE AUDIO FREQUENCY

FIELD OF THE DISCLOSURE

The present disclosure relates to a system to generate low frequency vibrations to emulate frequency sounds, and more particularly, to utilize an exciter device for generating low frequency vibration waves and the low-middle frequency vibration waves to emulate frequency sounds.

BACKGROUND OF THE DISCLOSURE

Generally, high frequency sound may cause health effects, such as hearing loss, headache, tinnitus, fatigue, dizziness, and nausea. In order to solve these problems, in recent years, there has been a demand for higher sound quality in the field of earphones, headphones, and other acoustic devices.

Aging is one of the most significant indicators of hearing loss. Half of all adults who are 75 years old and older have disabling hearing loss—also known as presbycusis (age-related hearing loss).

It is important to recognize the early signs of this type of hearing loss so that you can intervene early. Early intervention can change the trajectory of your hearing health, maximize your hearing capacity and enhance daily life. And most importantly, treating hearing loss can help reconnect you to the people you love.

There is, therefore a need for a solution that will enable older ages (more than 30 years/old) or even all ages of people to have a sense of clean, enjoyable sound and precise image of the sound source in the low and low to middle-frequency sound using bone conduction.

All referenced patents, applications, and literature are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY OF THE DISCLOSURE

In a general implementation, a system for generating low and low to middle-frequency vibration waves to emulate low and low to middle audio frequencies may further comprise an exciter device comprising a solenoid device located adjacent to a vibration micro motor; wherein the solenoid device comprises an impact member contacted to a returning spring and configured to generate low frequency vibration waves; wherein the vibration micro motor comprises a motor coupled to at least one rotatable metal member and configured to generate low-middle frequency vibration waves.

In another aspect combinable with the general implementation, the solenoid device comprises a first pivot coupled with the impact member and the returning spring surrounds the first pivot.

In another aspect combinable with the general implementation, the returning spring is compressed towards the impact member to activate the impact member to generate the low frequency vibrations.

In another aspect combinable with the general implementation, the rotatable metal member is coupled with the motor through a second pivot and is rotating along the second pivot.

In another aspect combinable with the general implementation, the vibration micro motor comprises a pair of rotatable metal members coupled on two sides of the motor through a second pivot, wherein the rotatable metal members are rotating along the second pivot.

In another aspect combinable with the general implementation, the solenoid device and the vibration micro motor may be located inside a waterproof compartment.

In another aspect combinable with the general implementation, the system may further comprise a Bluetooth module communicated with a converter and configured to receive external audio frequency from an external audio frequency source.

In another aspect combinable with the general implementation, the exciter device is placed on a mandibular vestibule of a user's mouth.

In another aspect combinable with the general implementation, the system may further comprise a battery module communicated with the exciter device to provide electronic power to the exciter device.

In another aspect combinable with the general implementation, the system may further comprise an accelerometer placed adjacent to occipital bones of the user to receive the low and low to middle-frequency vibration waves and to convey the low and low to middle-frequency vibration waves to an analyzer, wherein the analyzer is configured to analyze the low and low to middle-frequency vibration waves and generate a frequency spectrum report.

In the alternative, the exciter device is placed on a mentolabial sulcus adjacent to a user's mouth.

It is still further contemplated that the converter is communicated with the sole device and the vibration micro motor to convert the external audio frequency to a responding voltage to activate low-frequency vibration waves and low-middle frequency vibration waves.

In still some embodiments, the first pivot is moving towards the impact member and moving away from the impact member to perform a back-and-forth movement.

In another aspect combinable with the general implementation, the returning spring is compressed towards the impact member and restored to its original form to perform a back-and-forth movement.

In another aspect combinable with the general implementation, the system may further comprise an audio band-pass filter communicated with the solenoid device and the vibration micro motor to extract low and low-middle audio frequencies from an external audio frequency generated from an external audio frequency source.

In another aspect combinable with the general implementation, the system may further comprise an audio power amplifier communicated with a Bluetooth module and configured to amplify the received external audio frequency.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features described in the context of a single implementation can also be implemented in multiple implementations separately or in any suitable subcombination. Moreover, although features may be described above and below as acting in certain combinations and even initially claimed as such, one or more features from a claimed combination can, in some cases, be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

It should be noted that the drawing figures may be in simplified form and might not be too precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

It shall be understood that the term "means," as used herein, shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

Unless defined otherwise, all technical and position terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

Figure 1:
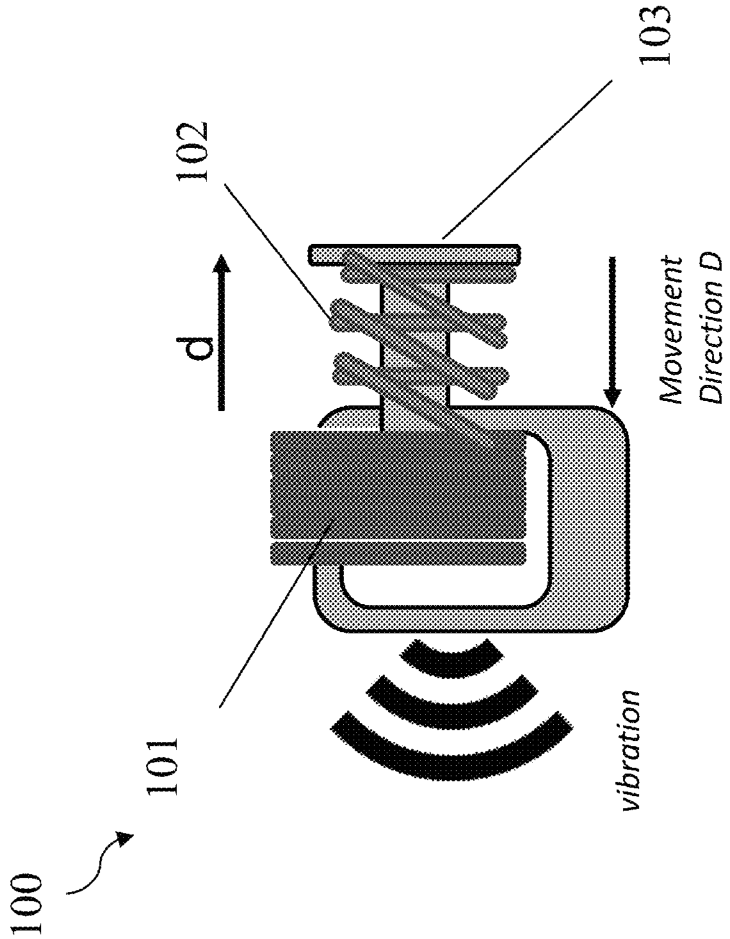
FIG. 1 shows a solenoid device of a system for generating low frequency vibration waves to emulate low audio frequencies according to an aspect of the embodiment.
Figure 2:
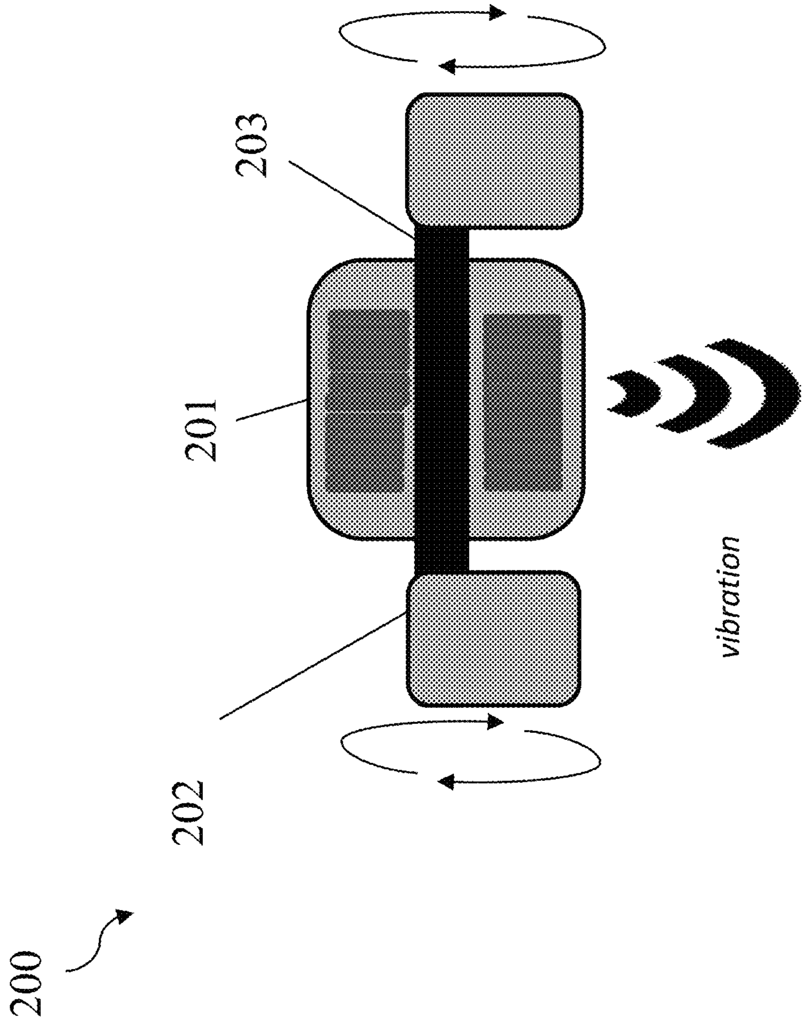
FIG. 2 shows a vibration micro motor according to an aspect of the embodiment.
Figure 3:
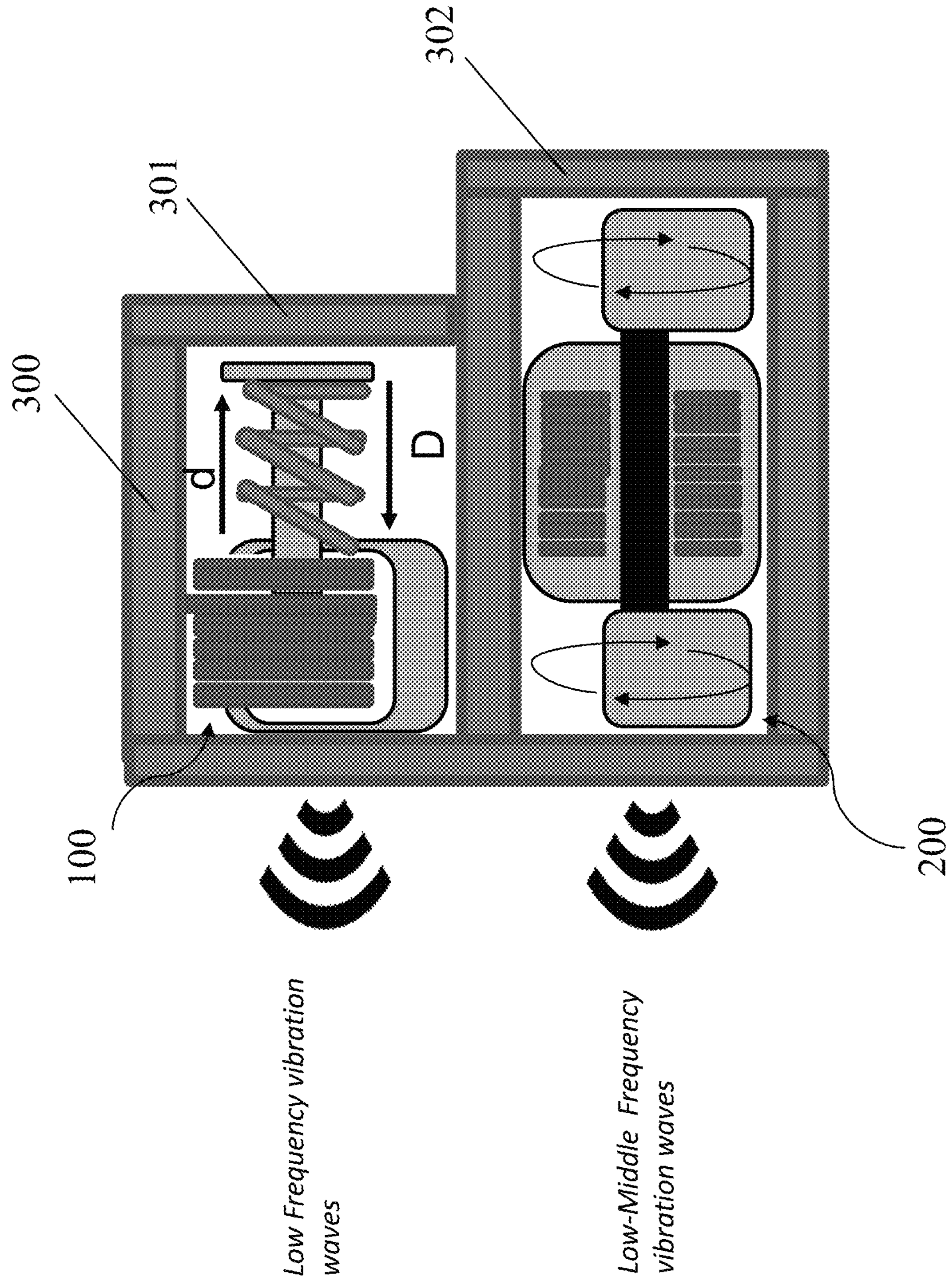
FIG. 3 shows an exciter device according to an aspect of the embodiment.

FIGS. 1-3 generally depict a system for generating low and low to middle-frequency vibration waves to emulate low and low to middle audio frequencies according to an aspect of the embodiment.

Referring to FIGS. 1-3, the system for generating low and low to middle-frequency vibration waves to emulate low and low to middle audio frequencies may comprise an exciter device 10 comprising a solenoid device 100 and a vibration micro motor 200 located adjacent to the solenoid device 100. In one embodiment, the solenoid device 100 may comprise an impact member 101 contacted to a returning spring 102 and configured to generate low frequency vibration waves.

Continuing to FIG. 1, the solenoid device 100 may comprise a first pivot 103 coupled with the impact member 101 and the returning spring 102 may surround the first pivot 103. In some embodiments, the returning spring 102 may be compressed towards the impact member 101 to activate the impact member 101 to generate the low frequency vibration waves. In some embodiments, the returning spring 102 may be compressed towards a direction "D". In some embodiments, the returning spring 102 may be restored to its original form towards an opposite direction "d". It should be noted that the direction "D" may be opposite of the opposite direction "d".

In some embodiments, the returning spring 102 may be compressed towards the impact member 101 and restored to its original form to perform a back-and-forth movement. Accordingly, in still some embodiments, the first pivot 103 may be moving towards the impact member 101 and moving away from the impact member 101 to perform a back-and-forth movement, wherein the back-and-forth movement of the returning spring 102 may be synchronously performed with respect to the back-and-forth movement of the first pivot 103.

Referring to FIG. 2, the vibration micro motor 200 may comprise a motor 201 coupled to at least one rotatable metal member 202 and configured to generate low-middle frequency vibration waves. In some embodiments, the rotatable metal member 202 may be coupled with the motor 201 through a second pivot 203, and in such a manner, the rotatable metal member 202 may be rotating along the second pivot 203.

In some embodiments, the vibration micro motor 200 may comprise a pair of rotatable metal members 202 coupled on two sides of the motor 201 through a second pivot 203, wherein the rotatable metal members 202 are rotating along the second pivot 203. It should be noted that, in some embodiments, the pair of rotatable metal members 202 may be rotated in the same direction. In other embodiments, one of the pair of the rotatable metal members 202 may be clockwisely rotated, and the other one of the pair of the rotatable metal members 202 may be counter-clockwisely rotated.

In some embodiments, the pair of the rotatable metal members 202 may be coupled on two ends of the second pivot 203, wherein one of the pair of the rotatable metal members 202 may be coupled on one end of the second pivot 203 and the other one of the pair of the rotatable metal members 202 may be coupled on the other end of the second pivot 203, wherein the one end of the second pivot 203 may be formed on an opposite side of the other end of the second pivot 203.

FIG. 3 generally depicts the solenoid device 100 and the vibration micro motor 200 according to an aspect of the embodiment.

Referring to FIG. 3, the solenoid device 100 and the vibration micro motor 200 may be located inside a waterproof compartment 300, wherein the solenoid device 100 may be located inside a first waterproof compartment 301 and the vibration micro motor 200 may be located inside a second waterproof compartment 302. In some embodiments, the first waterproof compartment 301 may overlap with the second waterproof compartment 302.

Figure 4:
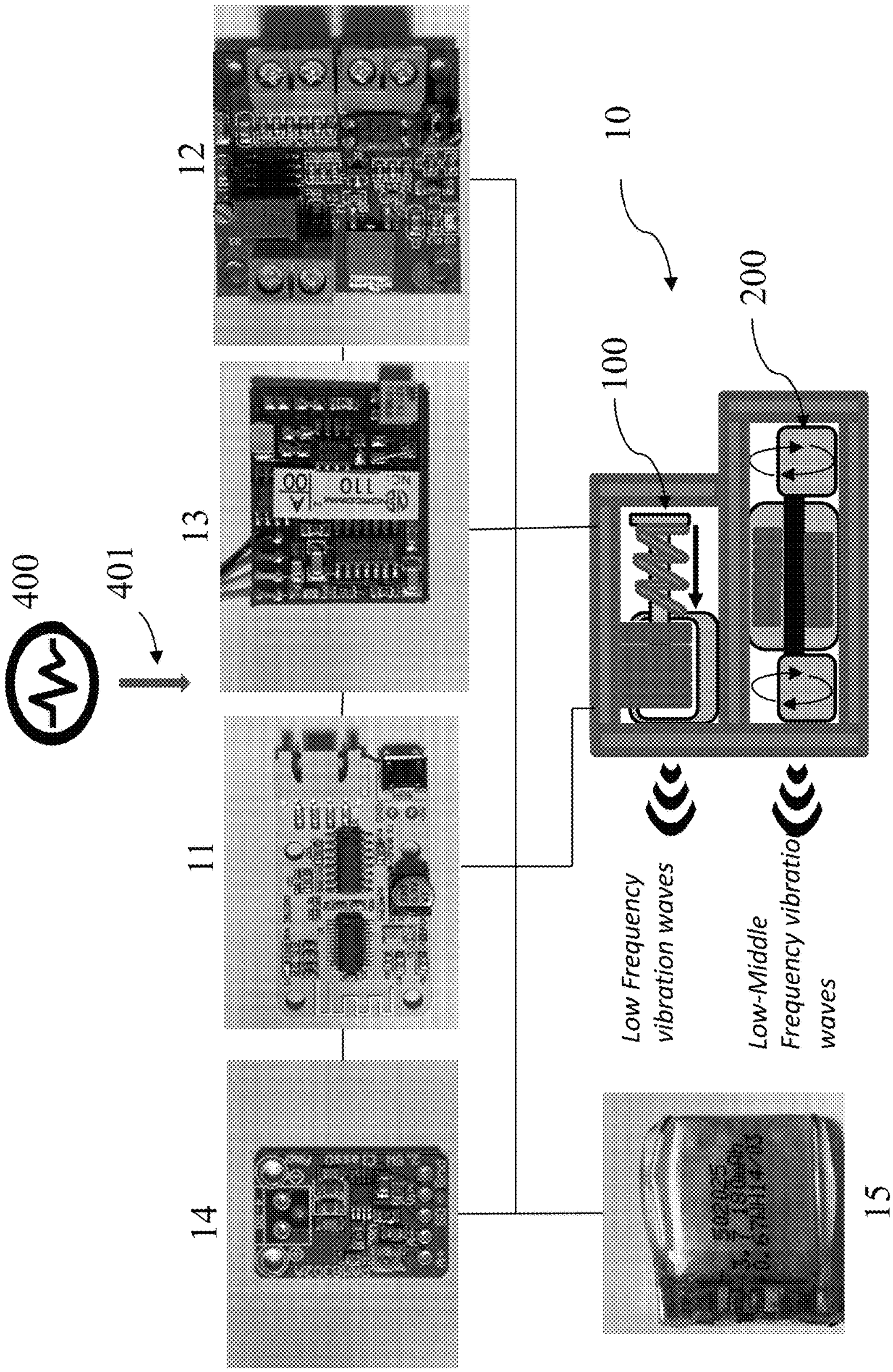
FIG. 4 shows a system for generating low-frequency vibration waves to emulate the low audio frequencies according to an aspect of the embodiment.

FIG. 4 generally depicts the system for generating low and low to middle-frequency vibration waves to emulate low and low to middle audio frequencies according to an aspect of the embodiment.

Referring to FIG. 4, the system 10 may further comprise a Bluetooth module 11 communicated with a converter 12 and configured to receive external audio frequency 401 from an external audio frequency source 400.

As shown in further details in FIG. 4, the converter 12 may be communicated with the solenoid device 100 and the vibration micro motor 200, wherein the converter 12 may be configured to convert the external audio frequency to a responding voltage to activate low-frequency vibration waves and low-middle frequency vibration waves.

In some embodiments, the system may further comprise an audio band-pass filter 13 communicated with the solenoid device 100 and the vibration micro motor 200 to extract the low and low-middle external audio frequency from the external audio frequency 401 generated from the external audio frequency source 400.

In still some embodiments, the system may further comprise an audio power amplifier 14 communicated with the Bluetooth module 11, and the audio power amplifier 14 may be configured to amplify the received external audio frequency.

In still some embodiments, the system may further comprise a battery module 15 communicated with the exciter device 10 to provide electronic power to the exciter device 10.

Figure 5:
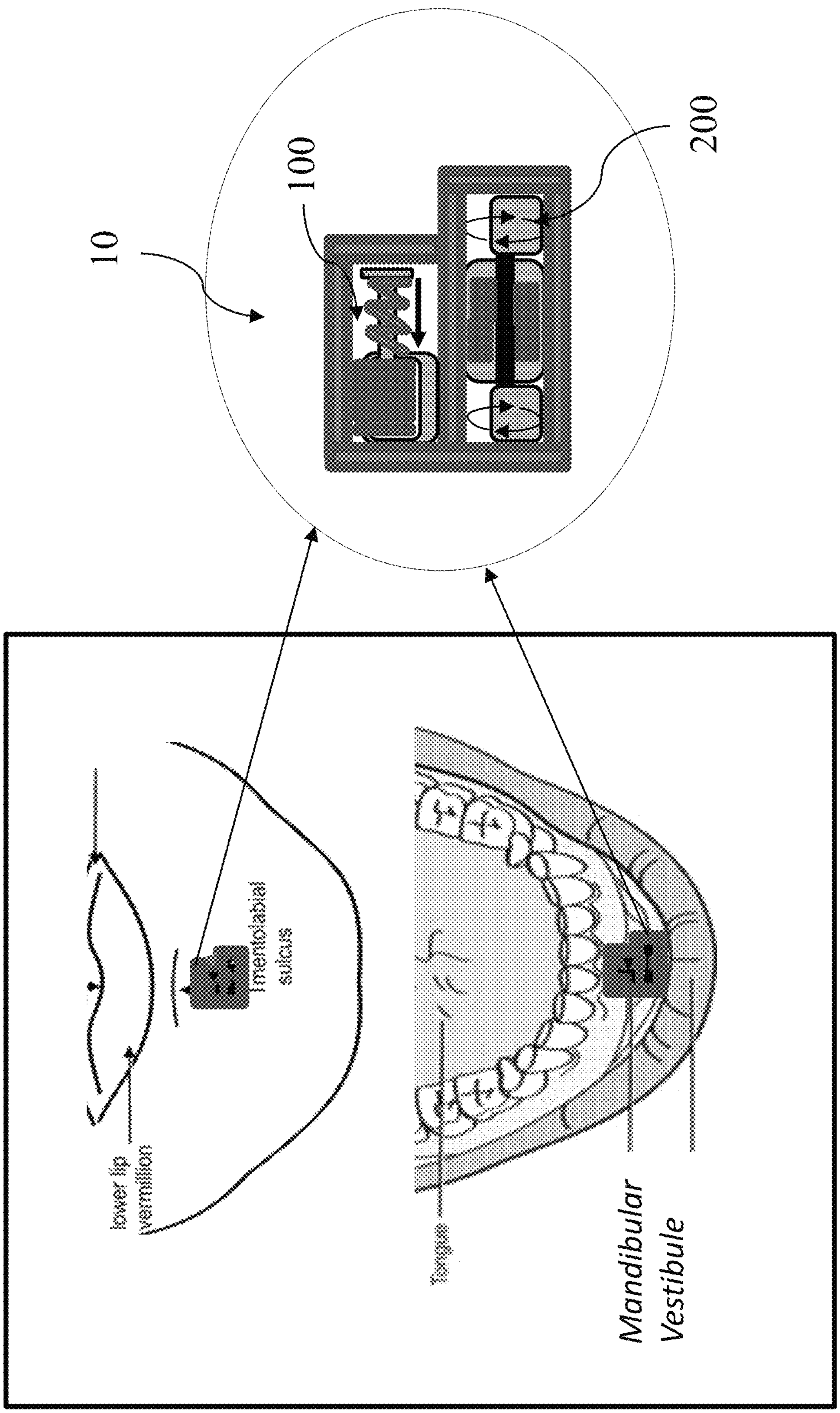
FIG. 5 shows the exciter device being cooperated with a user's mouth according to an aspect of the embodiment.
Figure 6:
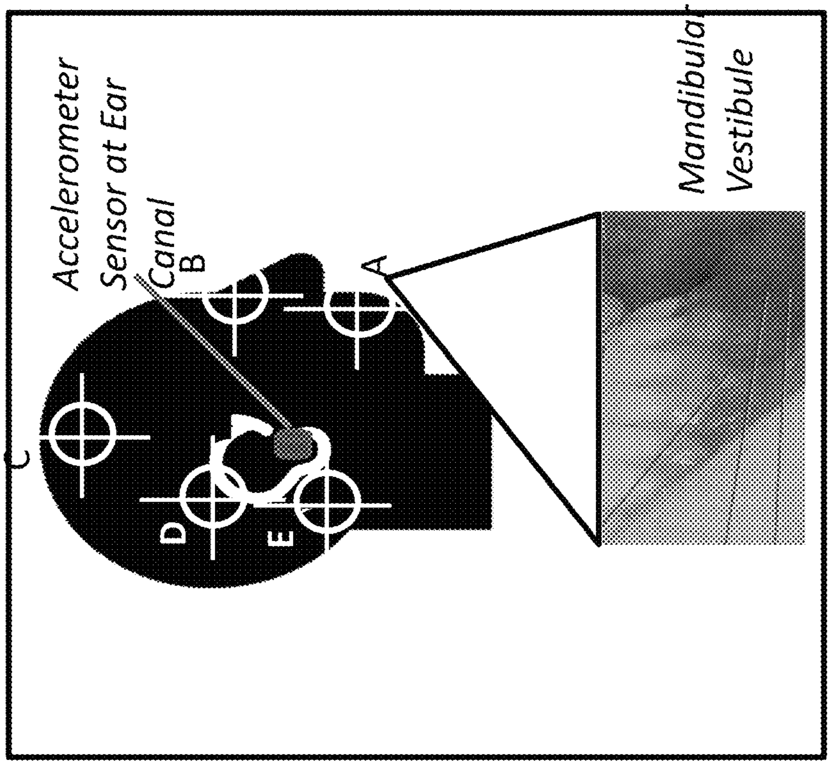
FIG. 6 is a schematic view showing where the low-frequency vibration waves and low-middle frequency vibration waves are transmitted according to an aspect of the embodiment.

FIGS. 5-6 generally depict the system for generating low and low to middle-frequency vibration waves to emulate low and low to middle audio frequencies that cooperates with a user's mouth according to an aspect of the embodiment.

Referring to FIG. 5, the exciter device 10, including the solenoid device 100 and the vibration micro motor 200, may be placed on a mandibular vestibule of a user's mouth.

In some embodiments, the exciter device 10, including the solenoid device 100 and the vibration micro motor 200, may be placed at the lower side of the face (Mentolabial Sulcus) or be held by a lower vermilion lip to prevent the exciter device 10 being swallowed.

According to FIG. 5, the low-frequency vibration waves generated from the solenoid device 100 and the low-middle frequency vibration waves generated from the vibration micro motor 200 may be emitted to the maxilla or the mandibular bones. In some embodiments, the exciter device 10 may not be contacted with the teeth.

It should be noted that, in some embodiments, the lubricant may be used to smooth the use of the exciter device 10, wherein the lubricant may be Trident (#LP20), used by scuba-divers to lubricate the mouthpiece and the lubricant may be completely safe for in-mouth use on a reasonable amount.

Figure 7:
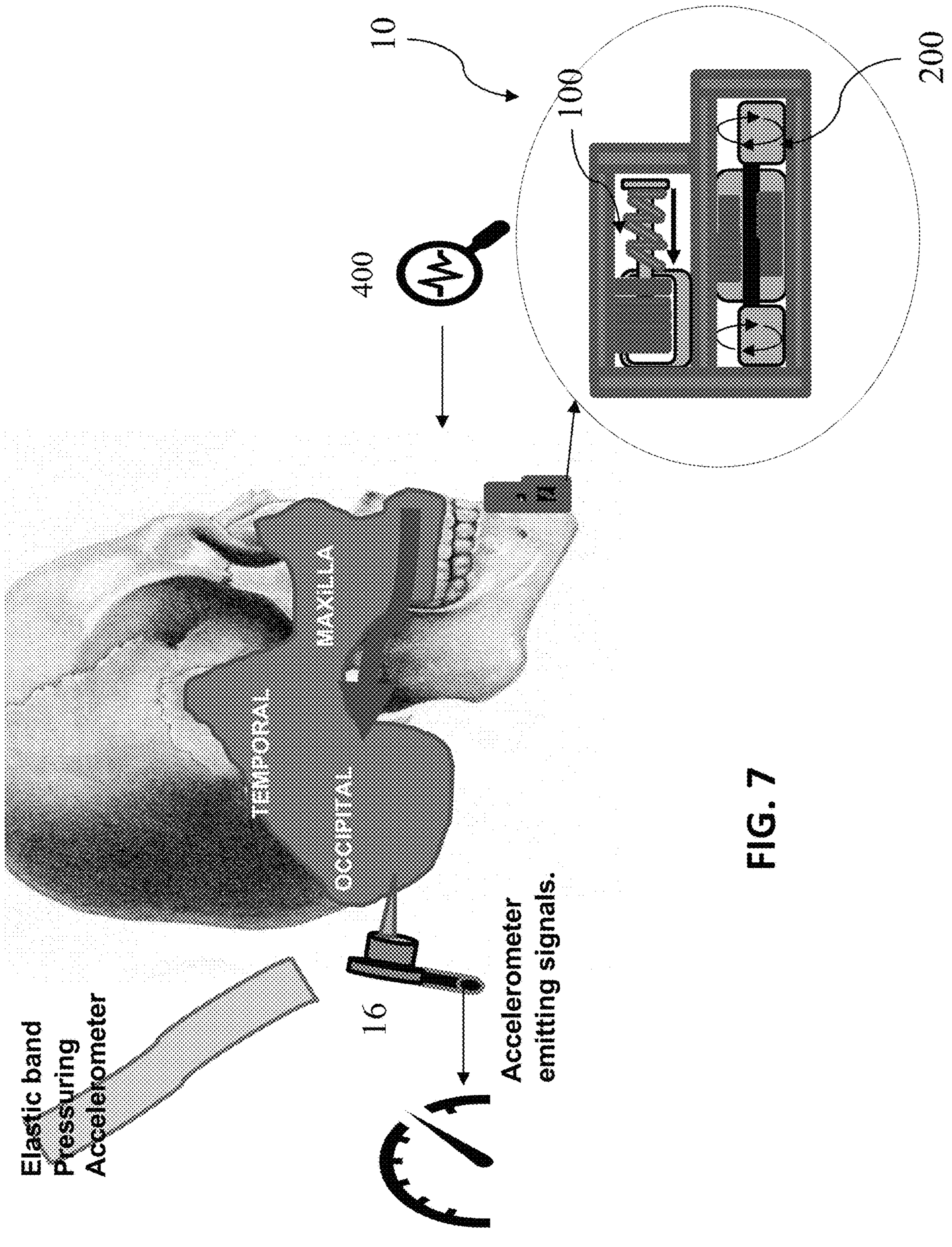
FIG. 7 is a schematic view showing where the low-frequency vibration waves and low-middle frequency vibration waves are transmitted according to an aspect of the embodiment.
Figure 8:
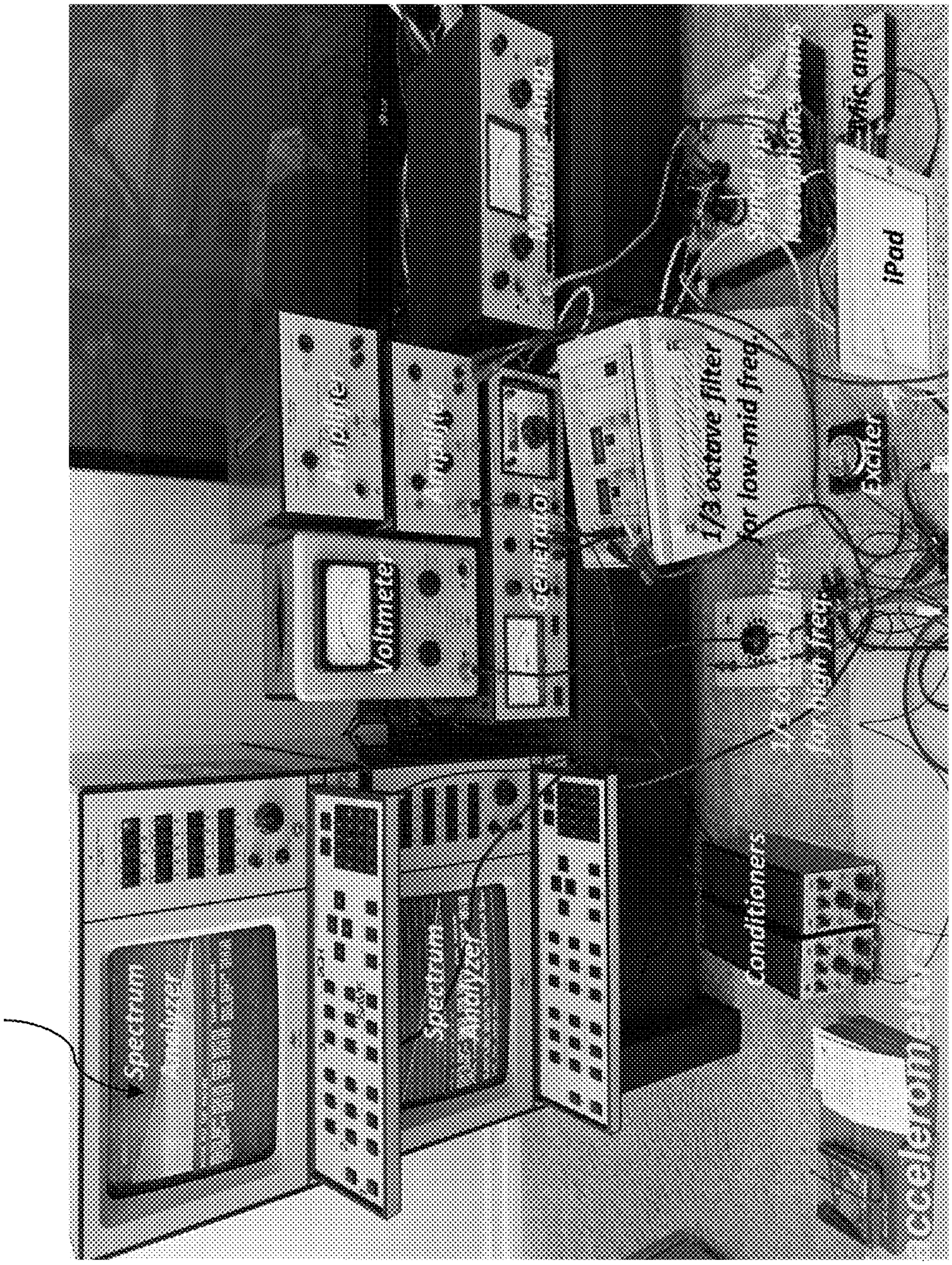
FIG. 8 is a perspective view of a system for generating low-frequency vibration waves to emulate the low audio frequencies according to an aspect of the embodiment.

FIGS. 6-8 generally depict the system for generating low and low to middle-frequency vibration waves to emulate low and low to middle audio frequencies according to an aspect of the embodiment.

Continuing to FIG. 6, in some embodiments, the low-frequency vibration waves generated from the solenoid device 100 and the low-middle frequency vibration waves generated from the vibration micro motor 200 may vibrate the Alveolar Process bone of the mandible (A), over the nose close to the nasal bone (B), top of the head for the parietal bone (C), over the ear for the upper side of the Temporal bone (D) and under the ear for the lower side of the Temporal bone (E) that covers the hearing system. "D" and "E" locations which are measured on each side (Left and Right) of the user.

Referring to FIGS. 7-8, the system may further comprise an accelerometer 16 placed adjacent to occipital bones of the user to receive the low and low to middle-frequency vibration waves and to convey the low and low to middle-frequency vibration waves to an analyzer 17, wherein the analyzer 17 is configured to analyze the low and low to middle-frequency vibration waves and generate a frequency spectrum report.

FIGS. 9-20 generally depict collected data represented by the analyzer according to an aspect of the embodiment.

Figure 9:
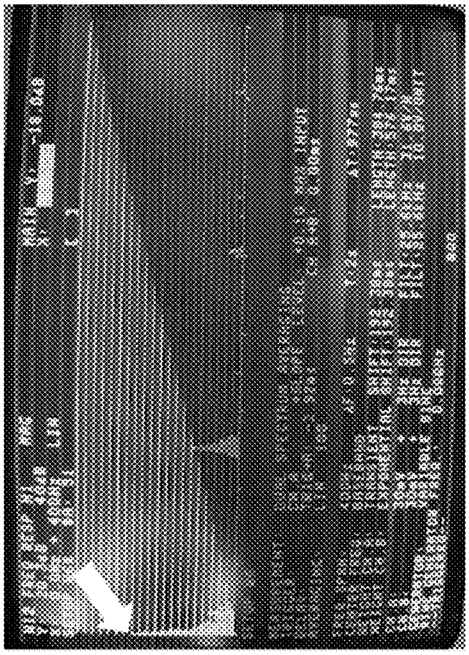
FIGS. 9-20 show collected data and results according to an aspect of the embodiment.

The solenoid device response: modal parameters which define the structure vibration properties. These are modal frequency and modal damping. The magnitude of the frequency response function for the structure test is measured from 0 Hz to 400 Hz. As shown in FIG. 9, the modal frequency of the system is 16.5 Hz as the highest magnitude or resonance frequency. Harmonic signals are perceived at 126 Hz and 252 Hz.

Figure 10:
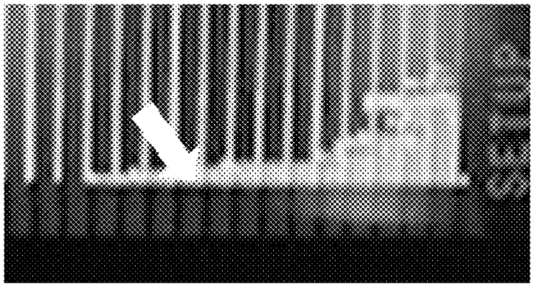
Figure 11:
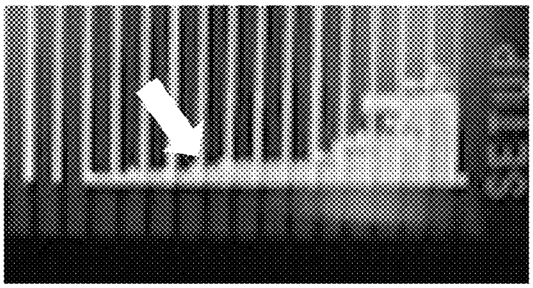

Modal damping of the resonance frequency (FIG. 9) is defined as:

$$\delta r = f2 - f1 \backslash 2fr$$

where f2−f1 is 11 Hz-20 Hz=9 Hz and 2 fr is 33 Hz, so modal damping is 0.27. Implementing zoom to the measured graph, f1 and f2 are shown (FIG. 10 and FIG. 11).

Figure 12:
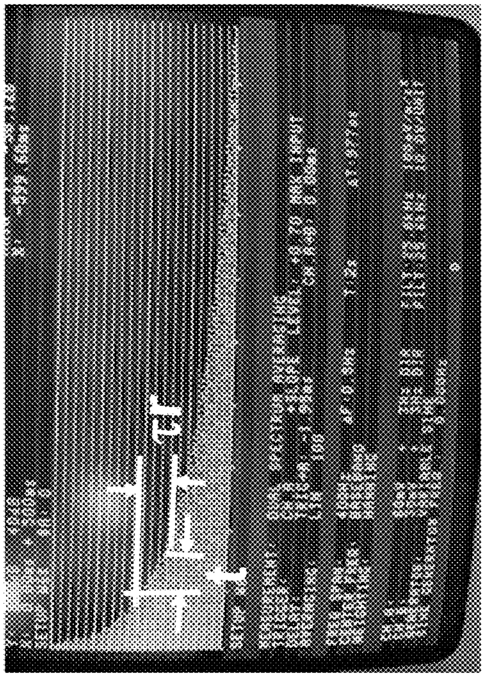

The impulse response function is represented by its magnitude on a logarithmic scale to determine the decay rate or damping ratio, where x is 0 to 500 ms and y is o to 40 dB (FIG. 12).

$$\xi r = \delta r / 2\pi fr = 1/\tau r(2\pi fr)$$

The decay related to time constant "τr" is a factor of $e^{-1}$, so in dB −20 log(e) or −10 dB, the time is 50 ms that applied to the formula bellow gives a damping ratio=0.025.

Figure 13:
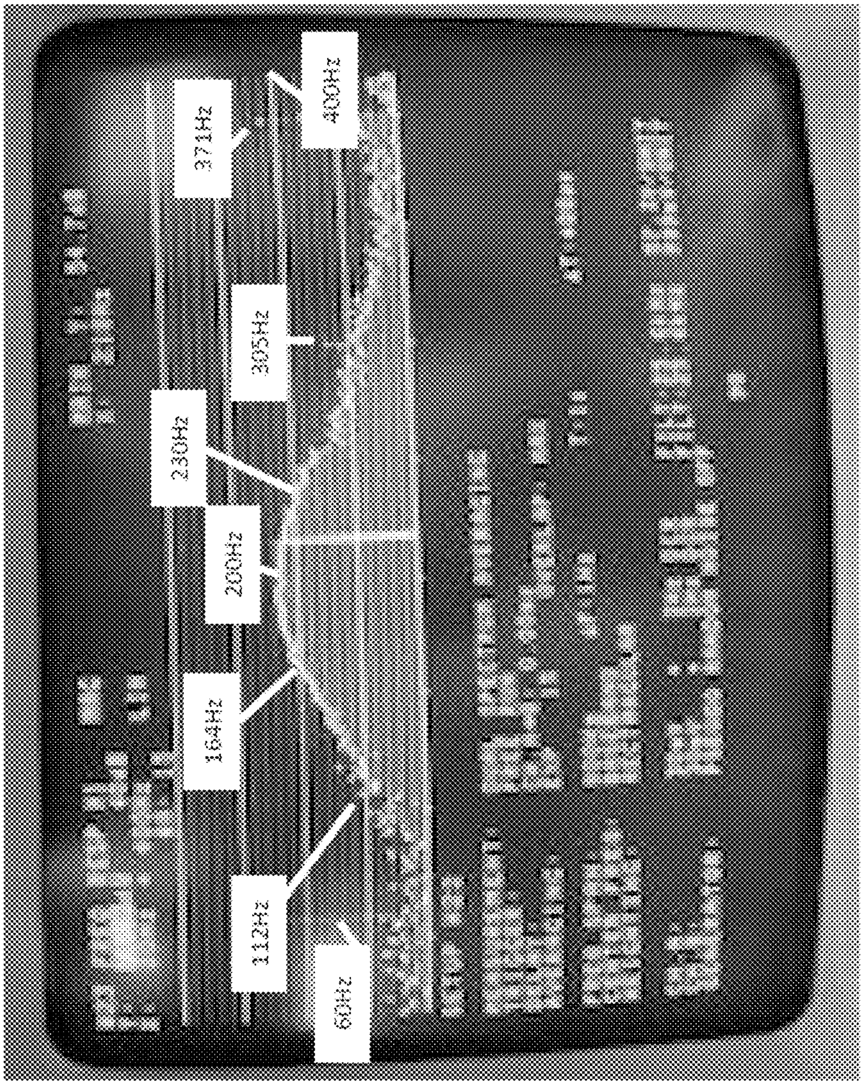

FIG. 13 shows the response of the vibration micro motor according to an aspect of the embodiment.

The measurements of the vibration micro motor are performed with an input supply of 3.5 VDC. The motor itself presents a major oscillation frequency of 100 Hz. The frequency response spreads out as a series of modes that covers frequencies from 100 Hz to 300 Hz. The 60 Hz plot is from a supply voltage leak.

Figure 14:
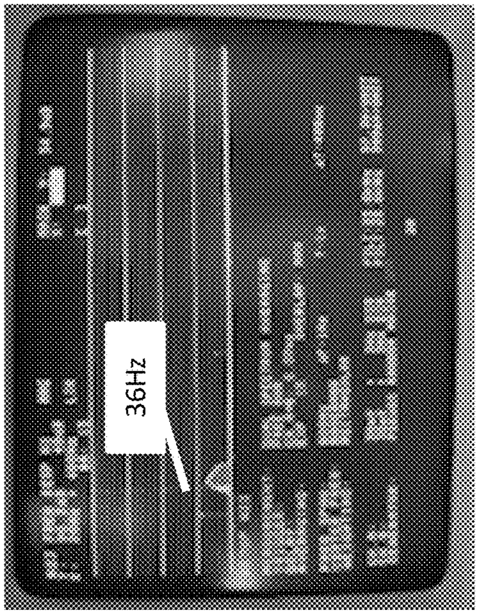
Figure 15:
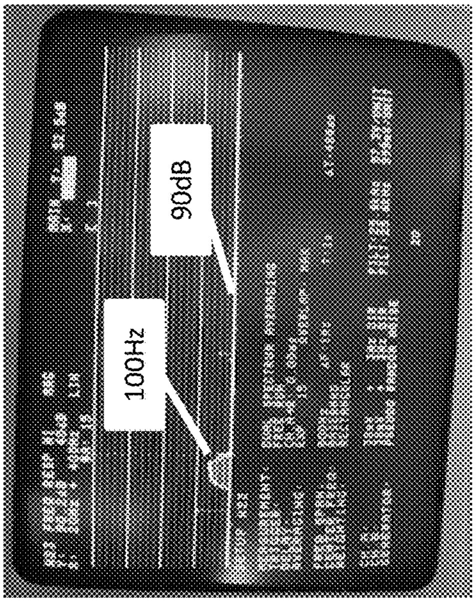
Figure 16:
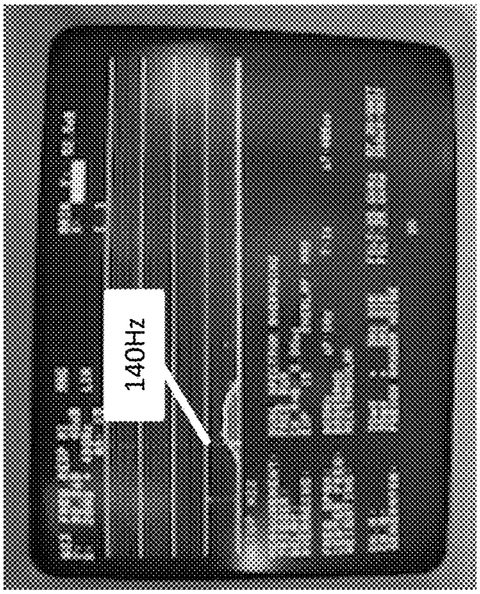
Figure 17:
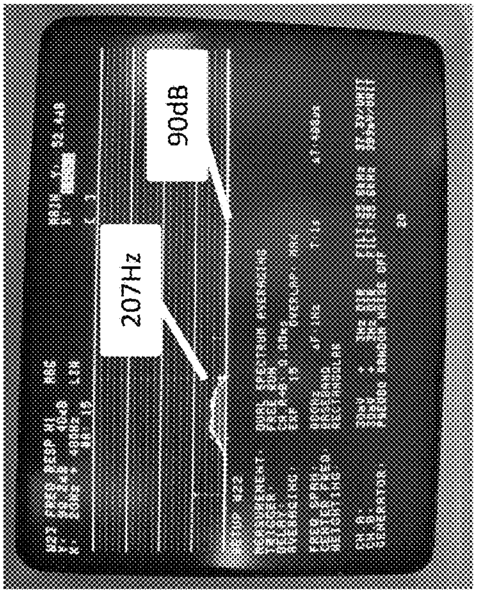
Figure 18:
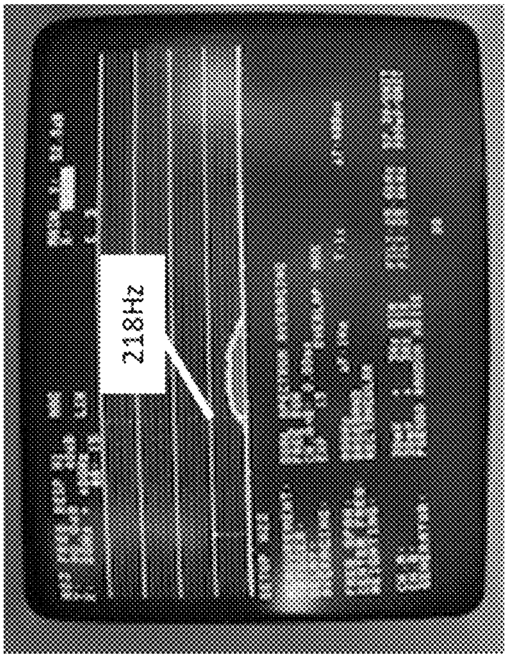
Figure 19:
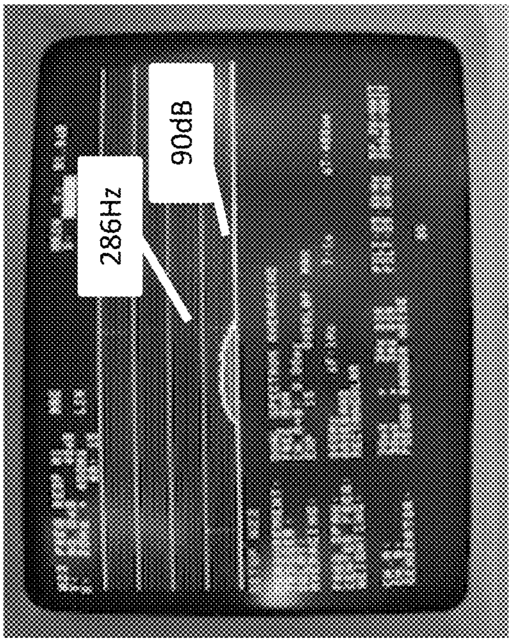

The vibration parameters of the exciter device may be analyzed as a residual noise since the vibration created is generated by a radial movement that is a-cyclical or unbalanced from the motor pivot. This intentional movement generates a series of vibrations depending on the motor's radial velocity. The motor design defines velocity which depends on the DC (Direct Current) input voltage. The minimum voltage of the cycles of the motor is 0.5 VDC, generating a vibration frequency response between 36 Hz to 100 Hz, with enough amplitude to be perceivable of 95 dB (FIGS. 14-15). Following 2 VDC input is measured giving a range 140 Hz to 207 Hz, with the same amplitude to be 95 dB (FIGS. 16-17). With an input voltage of 3.5 VDC, the frequency range is 218 Hz to 286 Hz, with the same amplitude of 95 dB (FIGS. 16-17). The amplitude is stable at all voltages which are appropriate for the device to maintain stable vibrations. The frequency-to-voltage converter generates a range from 0.5V to 3.5 VDV for frequencies starting at 30 Hz to 300 Hz. For better performance with accurate frequency-to-voltage conversion.

Figure 20:
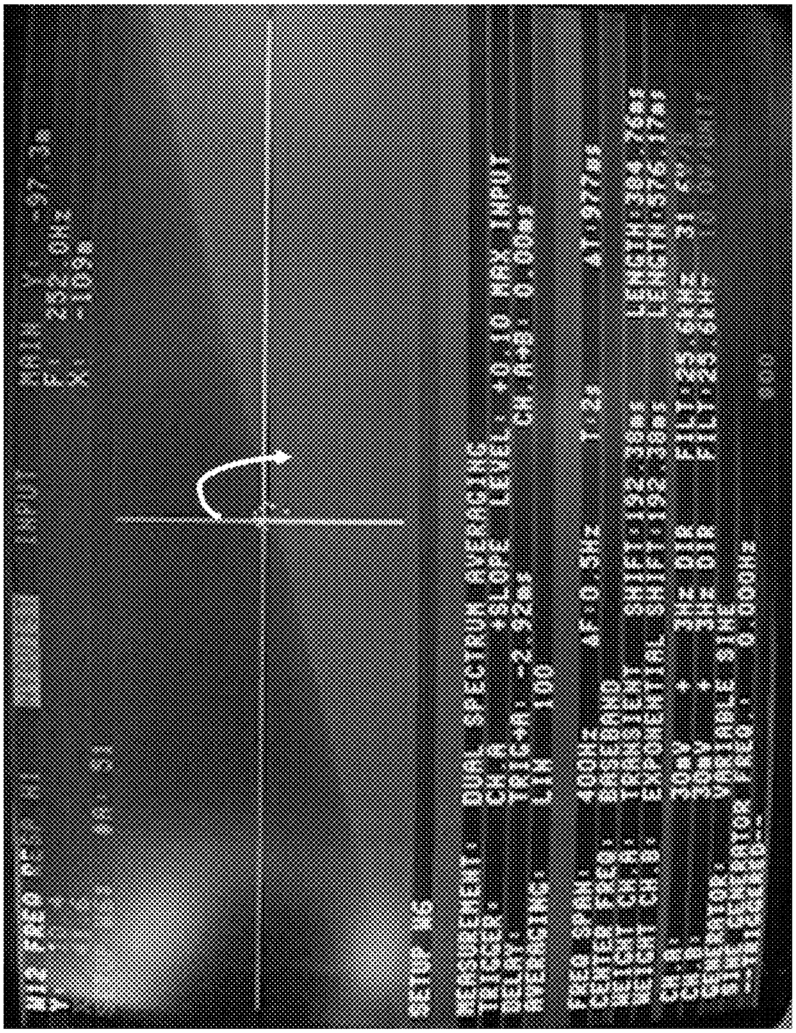

Referring to FIG. 20, a Nyquist plot is for assessing the stability of a system. The imaginary part is plotted on the Y-axis. The frequency is swept as a parameter, resulting in a plot per frequency. The plot is polar coordinates where gains of the transfer function and is the radial coordinate, and the phase of the transfer function is the corresponding angular coordinate. Stability is determined by looking at the number of encirclements of the point at (−1,0). The range of gains over the system can be determined by looking at crossings of the real axis. Although the frequencies are not indicated on the curve, it can be inferred that the zero-frequency point is on the right, and the curve spirals toward the origin at a high frequency. This is because gain at zero frequency must be purely real (on the X axis) and is commonly non-zero, while most physical processes have some amount of low-pass filtering, so the high-frequency response is zero.

After computing the Nyquist plot (FIG. 20), stability margins are determined. Open loop poles are required to get the close loop zeros. This is because the number of poles is equal to the negative value of the clockwise encirclements of −1. If it is not equal, there is a zero on the horizontal right side (x or real).

The close loop is a stable pole because there is no left-side curve. All of the curves are on the right side. The close loop is a stable pole so no open loops are on the right side (no encirclements of horizontal −1 (x or real)). 2 or more times is −1 horizontal (x or real) and is encircled with counter-clock direction.

Results show that a force within the range of +/−1 pC/N on exciter input of 1 VRMS (as requirement from experiment 1), is the achieved level for ideal loud perception at low frequencies. Vibrations achieved as expected from 30 Hz to 300 Hz approximately. The frequency of audio is transferred to DC voltage through a step-motor. Gains are achieved and stable in the order of 95 dB which has enough vibration to be perceived. Nyquist plot confirms that the closed loop system is stable, which means that results are not random but linear.

Those with ordinary skill in the art may make many alterations and modifications without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

Thus, specific embodiments and applications of the system to generate low-frequency vibration waves to emulate low and low-middle audio frequencies have been disclosed. It should be apparent, however, to those skilled in the art that many more modifications besides those already described are possible without departing from the disclosed concepts herein. Therefore, the disclosed embodiments are not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Insubstantial changes from the claimed subject matter as viewed by a person with ordinary skill in the art, now known or later devised, are expressly contemplated as equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted, and what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings but to include by special definition in this specification structure, material, or acts beyond the scope of the commonly defined meanings. Thus, if an element can be understood in this specification as including more than one meaning, its use in a claim must be understood as being generic to all possible meanings supported by the specification, and its use in a claim must be understood as being generic to all possible meanings supported by the specification and the word itself.

The definitions of the words or elements of the following claims, therefore, include not only the combination of elements set forth but all equivalent structures, material, or acts for performing substantially the same function in the same way to obtain the same result. Therefore, it is contemplated that an equivalent substitution of two or more elements may be made for any of the elements in the claims below or that a single element may be substituted for two or more elements in a claim. Although elements may be described above as acting in certain combinations and even initially claimed as such, it is to be expressly understood that one or more elements from a claimed combination can, in some cases, be excised from the combination and that the claimed combination may be directed to a subcombination or variation of a subcombination.

What is claimed is:

1. A system for generating low and low to middle-frequency vibration waves to emulate low and low to middle audio frequencies, comprising:

an exciter device comprising a solenoid device located adjacent to a vibration micro motor;

wherein the solenoid device comprises an impact member contacted to a returning spring and configured to generate low frequency vibration waves;

wherein the vibration micro motor comprises a motor coupled to at least one rotatable metal member and configured to generate low-middle frequency vibration waves; and wherein the exciter device is placed on a mandibular vestibule of a user's mouth.

2. The system of claim 1, wherein the solenoid device comprises a first pivot coupled with the impact member and the returning spring surrounds the first pivot.

3. The system of claim 1, wherein the returning spring is compressed towards the impact member to activate the impact member to generate the low frequency vibration waves.

4. The system of claim 1, wherein the rotatable metal member is coupled with the motor through a second pivot and is rotating along the second pivot.

5. The system of claim 1, wherein the vibration micro motor comprises a pair of rotatable metal members coupled on two sides of the motor through a second pivot, wherein the rotatable metal members are rotated along the second pivot.

6. The system of claim 1, wherein the solenoid device and the vibration micro motor are located inside a waterproof compartment.

7. The system of claim 1, further comprising a Bluetooth module communicated with a converter and configured to receive external audio frequency from an external audio frequency source.

8. The system of claim 1, further comprising a battery module communicated with the exciter device to provide electronic power to the exciter device.

9. The system of claim 1, further comprising an accelerometer placed adjacent to occipital bones of the user to receive the low and low to middle-frequency vibration waves and to convey the low and low to middle-frequency vibration waves to an analyzer, wherein the analyzer is configured to analyze the low and low to middle-frequency vibration waves and generate a frequency spectrum report.

10. The system of claim 1, wherein the exciter device is placed on a mentolabial sulcus adjacent to a user's mouth.

11. The system of claim 7, wherein the converter is communicated with the solenoid device and the vibration micro motor to convert the external audio frequency to a responding voltage to activate low-frequency vibration waves and low-middle frequency vibration waves.

12. The system of claim 2, wherein the first pivot moves towards the impact member and moves away from the impact member to perform a back-and-forth movement.

13. The system of claim 1, wherein the returning spring is compressed towards the impact member and restored to its original form to perform a back-and-forth movement.

14. The system of claim 1, further comprising an audio band-pass filter communicated with the solenoid device and the vibration micro motor to extract low and low-middle external audio frequency from an external audio frequency generated from an external audio frequency source.

15. The system of claim 7, further comprising an audio power amplifier communicated with the Bluetooth module and configured to amplify the received external audio frequency.

* * * * *